B. R. JOLLY.
SPECIFIC GRAVITY BALANCE.
APPLICATION FILED JAN. 22, 1910.
1,072,952.
Patented Sept. 9, 1913.
3 SHEETS—SHEET 2.
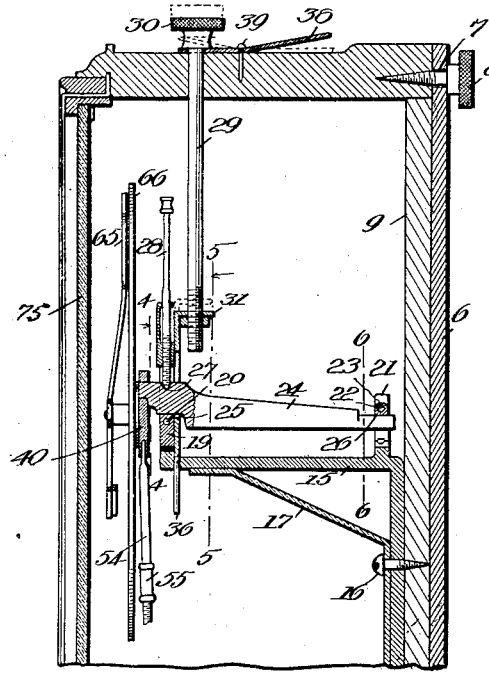
Fig. 3.
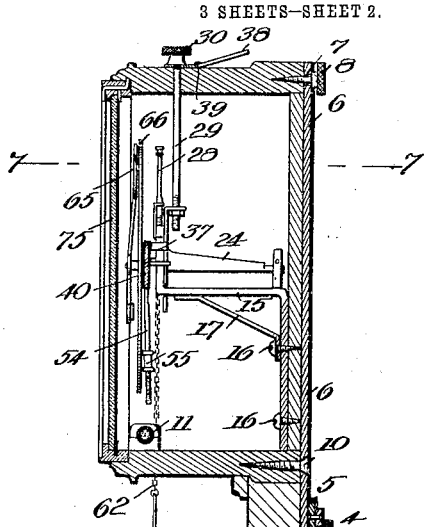
Fig. 2.
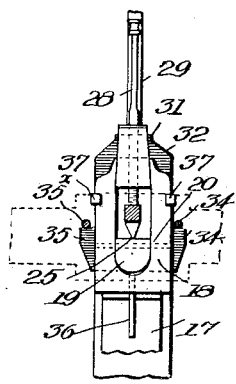
Fig. 4.
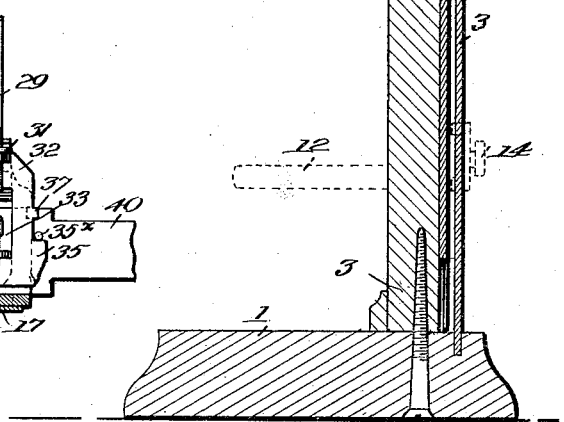
Fig. 5.
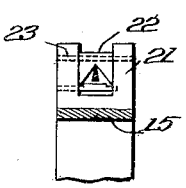
Fig. 6.
WITNESSES:
F. E. Barry
L. A. Stanley
INVENTOR
Benjamin R. Jolly
BY Munn & Co.
ATTORNEYS
COLUMBIA PLANOGRAPH CO., WASHINGTON, D. C.

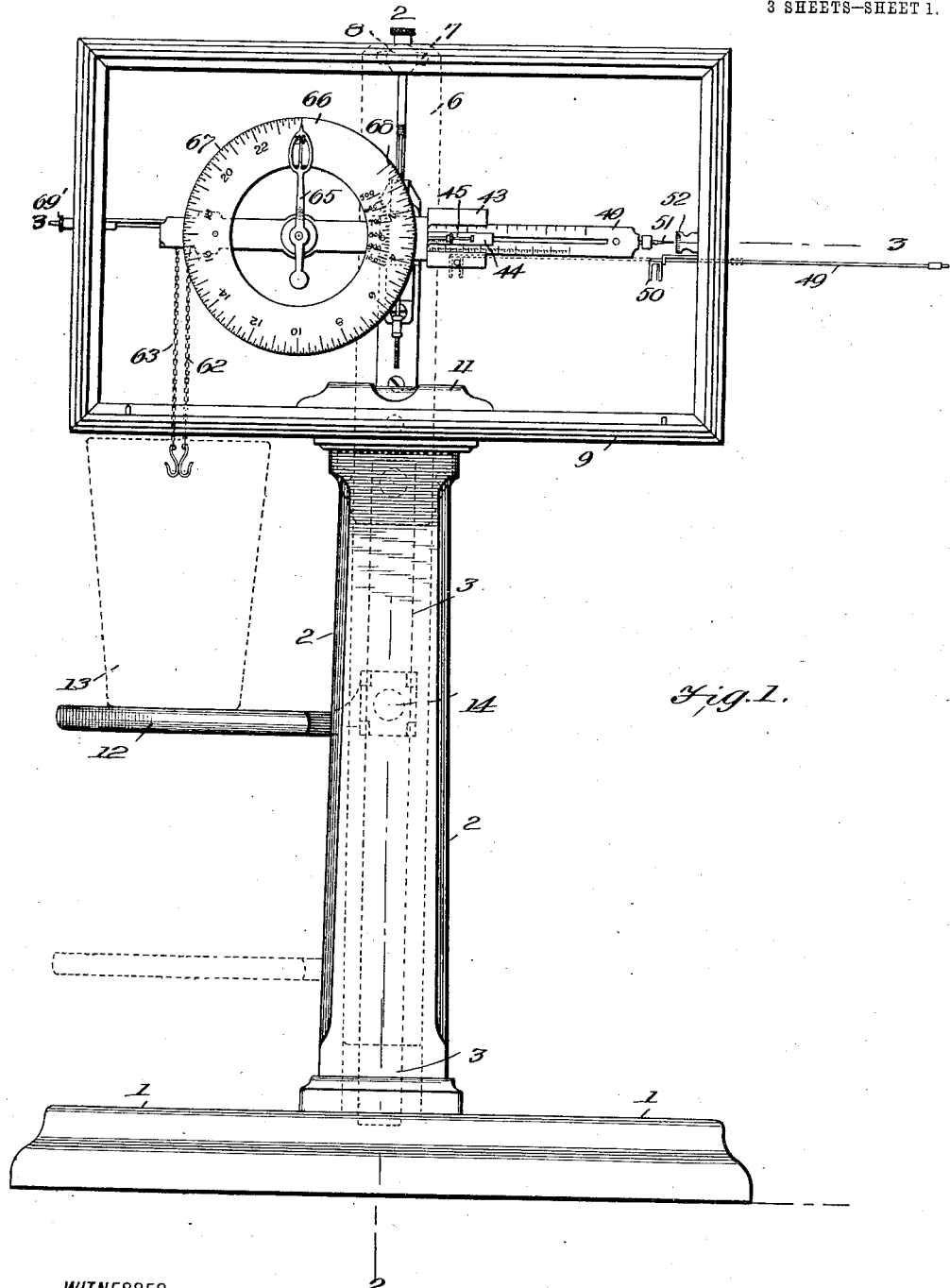

B. R. JOLLY.
SPECIFIC GRAVITY BALANCE.
APPLICATION FILED JAN. 22, 1910.

1,072,952.

Patented Sept. 9, 1913.

3 SHEETS—SHEET 3.

WITNESSES:
F. C. Barry
L. A. Stanley

INVENTOR
BENJAMIN R. JOLLY
BY Munn & Co.
ATTORNEYS

UNITED STATES PATENT OFFICE.

BENJAMIN RUSH JOLLY, OF RALEIGH, NORTH CAROLINA.

SPECIFIC-GRAVITY BALANCE.

1,072,952. Specification of Letters Patent. Patented Sept. 9, 1913.

Application filed January 22, 1910. Serial No. 539,511.

*To all whom it may concern:*

Be it known that I, BENJAMIN RUSH JOLLY, a citizen of the United States, and a resident of Raleigh, in the county of Wake and State of North Carolina, have made certain new and useful Improvements in Specific-Gravity Balances, of which the following is a specification.

My invention relates to improvements in indicating balances and it consists in the combinations, constructions and arrangements hereinafter described and claimed.

An object of my invention is to provide a device which is somewhat similar in its nature to that disclosed in a prior Patent No. 945,329, of January 4, 1910, but which differs in certain novel features which will be made subject of the appended claims.

An object of my invention is to provide a device in which certain balancing processes are carried out by means of a thumb-screw which operates a dial so that when a balance is obtained the pointer on the dial will indicate directly the fineness of gold or silver without further calculation.

My invention is illustrated in the accompanying drawings in which—

Figure 7:
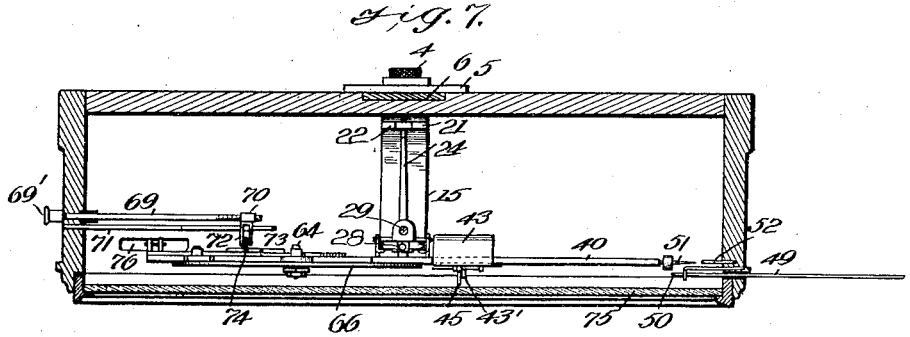
Figure 8:
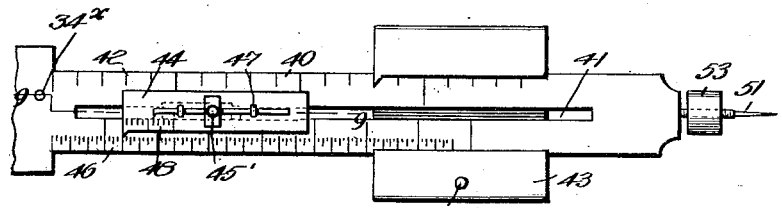
Figure 9:
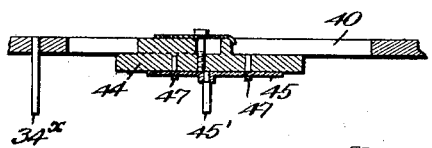
Figure 10:
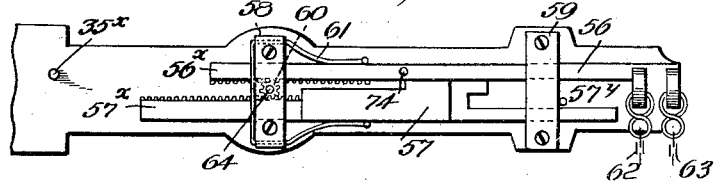
Figure 11:
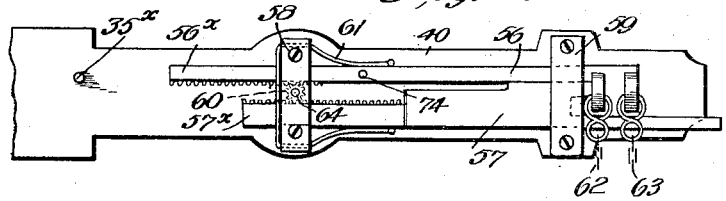

Figure 1 is a front view of my improved balance. Fig. 2 is a vertical section along the line 2—2 of Fig. 1. Fig. 3 is an enlarged sectional view of the upper part of Fig. 2. Fig. 4 is a section along the line 4—4 of Fig. 3. Fig. 5 is a section along the line 5—5 of Fig. 3. Fig. 6 is a section along the line 6—6 of Fig. 3. Fig. 7 is a section along the line 7—7 of Fig. 2. Fig. 8 is an enlarged detail view of a portion of the beam. Fig. 9 is a section along the line 9—9 of Fig. 8. Fig. 10 is a rear view of the opposite end of the beam from that shown in Fig. 8, showing the moving parts in one position, and Fig 11 is a similar view, showing the moving parts in another position.

In carrying out my invention I provide a base 1 to which is secured an upright 2. In the rear of the upright is secured a metallic strip 3, which bears at its upper end a set screw 4, arranged to pass through a spacing member 5, which is secured to the end of the strip 3, in the manner shown in Fig. 2. Between the member 3 and the upright 2, I arrange a slidable rod 6, which is slotted at 7, in its upper end, to receive a set screw 8, which passes into the casing 9. The lower end of the casing is pivotally secured to the rod 6 by means of the screw 10. In Fig. 2, I have shown the casing 9 as resting directly upon the top of the standard 2, but it will be understood that by unloosening the set screw 4 the casing may be elevated or lowered by lifting it vertically and clamping it in position by means of the screw 4. It will also be seen that by moving the casing on its pivotal screw 10, and then tightening the screw 8, the device may be leveled as far as the opposite ends of the scale beam are concerned. To assist in this leveling operation I have provided the spirit level 11. The means for leveling the beam from front to rear is one of the novel features of the device and will be explained later.

In Fig. 1, I have shown a stand 12 for a cup or other receptacle 13. This stand is adjustably secured to the member 3 by means of a set-screw 14 and may be adjusted as desired.

In Fig. 3 is best shown the balance beam support. It consists of an L-shaped member 15 which is secured to the interior of the casing 9 by means of screws 16, and is suitably braced by a cross member 17. At the outer end of the member 15 is an upturned end 18 consisting of a yoke in which is the front bearing 19 for the balance, see Fig. 4. This bearing is pivotally suspended at 20 to the arms of the yoke 18. At the rear of the L-shaped member 15 is an upwardly projecting U-shaped extension 21 between the arms of which is pivotally mounted a V-shaped bearing 22. This bearing is suspended from the pin 23.

The supporting bar for the beam is best shown in Fig. 3. It consists of a tapering member 24 having a front knife-edge 25 and a rear knife-edge 26. The former rests on the flat surface of the bearing 19, while the latter engages underneath the V-shaped slot in the bearing 22. It will be apparent from this arrangement that the bearings will adjust themselves so as to permit both the front and rear knife-edges to contact along their entire bearing surface. On the upper side of the member 24, immediately above the pivoted pin 20, is a cone-shaped recess 27 arranged to receive the end of the rod 28, which may be screwed down to a sufficient distance to allow the member 24 to be lifted slightly from the bearing. It serves to bring the balance back into position if it should slip on the bearing and also serves to arrest the motion of the balance.

In Figs. 3, 4 and 5 I have shown the means by which the beam may be lifted from its bearings while not in use. This comprises a rod 29 extending downwardly through the top of the casing and provided on its upper end with a thumb-screw 30. The lower end of the rod is threaded to extend into a lateral projection 31, of a slidable plate 32, having a central opening 33, through which the support 24 passes and which is provided with shoulders 34 and 35. The bottom of the plate 32 is provided with a guide rod 36 which extends through the support 15. In order to further guide the plate 32, I provide the arms 37 which extend from each side of the plate 32 and hook in behind the yoke 18. When the thumb-screw 30 is manipulated the plate 32 may be drawn upwardly and the shoulders 34 and 35 engage the pins 34$^x$ and 35$^x$ respectively on the beam to lift it from its bearings. In order to accomplish this result quickly, as when in the operation of weighing, I provide a bent plate 38 which is pivoted at 39 and whose end extends underneath the thumb-screw 30. By bearing down on the raised end the rod 29 may be lifted, thereby carrying with it the plate 32, and when pressure is relieved, the beam is free to oscillate.

Referring now particularly to the construction of the beam itself, it will be seen that it comprises a main bar 40 which is slotted on one end at 41 and which may be provided with a suitable scale (as for instance pennyweights) on its upper edge as shown at 42. These divisions indicate the distance to which the large slide weight 43 is moved. A smaller weight 44 is secured in the slot 41 of the beam 40 and the distance to which this weight is moved may be read by the scale 46 on the lower edge of the beam. A third still smaller weight 45 is slidably secured to the weight 44 by means of the staples 47 and the distance to which this weight is moved is indicated by the scale 48 on the weight 44. In order to manipulate these weights from without the casing, I provide the rod 49 which extends through the casing and is provided with a U-shaped inner end 50, which may be turned so as to engage the pins 43′ and 45′ on the largest and smallest weights 43 and 45 respectively. The weight 44 may be moved to a desired position by the engagement of the pin 45′ with the staples 47′ at either end. At the outer end of the beam is a pointer 51 whose end is adjacent the scale 52 secured to the casing. An adjusting nut 53 is also provided for bringing the scale to the zero point. In Figs. 2 and 3, I have shown a downwardly extending rod 54 provided with a nut 55 for adjusting the sensibility of the balance. The compensating mechanism for this balance is on the opposite end of the scale beam, on the rear side thereof, as shown in Figs. 10 and 11. It consists of the sliding bars 56 and 57 whose ends terminate in racks 56$^x$ and 57$^x$ respectively. These bars slide beneath cleats 58 and 59. The racks are held in contact with the pinion 60 by means of a spring 61. At the outer end of the bar 56, the suspending chains 62 and 63 are attached. It will be observed that the bar 57 has a portion which is larger than the bar 56. This portion constitutes a sliding weight which is a compensating weight.

The shaft 64 extends through the beam 40 and bears on its outer end a pointer 65 which is secured frictionally to the shaft 64 in the manner of a clock hand. This pointer is adjacent the scale 66 which is secured to the scale beam. The scale may be marked with numbers designating carats as shown at 67 or with marks designating the fineness of silver as at 68.

The means for manipulating the slides 56 and 57 is best shown in Fig. 7. It consists of a rod 69 which engages a threaded nut 70. This nut is slidably mounted on a rod 71 secured to the inner side of the casing, and is provided with the arms 72 and 73 which are arranged to engage a pin 74 on the rod 56. It will be observed that when one of the arms 72 and 73 is in contact with the pin 74, the other arm is free, so that when the thumb-nut 69′ at the end of the rod 69 is turned, one of the arms will engage the pin to force the rod 56 in one direction, while the rod 57 will move in the opposite direction, through the action of the pinion 60 on the racks. Moreover, the rotation of the shaft 64 will cause the pointer to revolve over the face of the scale.

The apparatus may be provided with the glass front 75 and the chains 62 and 63 may extend through an opening 76 in the bottom of the casing so that the apparatus may be manipulated without the necessity of opening the casing.

From the foregoing description of the various parts of the device the operation thereof may be readily understood. By means of the thumb-wheel 69′ the rod 56 is run to its innermost position and the rod 57 to its outermost position, this being gaged by the stop 57$^y$ which engages the rod 57, see Fig. 10. The pointer 65 is now adjusted to the mark 24 on the scale which indicates pure gold. Let us assume that the fineness of an article such as a gold ring is to be determined. In the first place a level is obtained by means of the thumb-screw 8 in the manner already described. The weights 43, 44, and 45 are placed in the zero position shown in Fig. 1 and the nut 53 is adjusted so that when the scale beam is released by turning the thumb-nut 30 the pointer will be at the zero position. Now the article is placed on the chain 62 and a balance is obtained by moving the larger weights to the proper position by means of the rod 49. In the process of balancing the article it is more convenient to use the lever 38 at the top of the casing to raise the scale beam off from its knife-edges. After having obtained a balance, the weight is shifted to the chain 63 and the cup 13, containing water, is raised so as to immerse the article in the water. Obviously the buoyant force of the water will require a re-adjustment of weights of the scale beam in order to obtain a balance. This, however, is effected by means of the thumb-wheel 69' at the opposite end of the beam, for by turning the thumb-wheel the rod 56 is moved outwardly and hence the ring is moved farther away from the center of the beam, until a point is reached where the weight of the article in the water will just balance the weights on the opposite end of the beam. This is gotten by a series of trials in which the pointer is moved in the manner explained, the arms 72 and 73 being moved away from the pin 74 at each trial, in order to give the beam opportunity to swing when it is released by the lever 38 on top of the casing. Finally a balance is obtained, and by reading the scale one may determine the fineness of the gold directly.

Instead of using two chains, the chain 62 alone may be used. In this case the additional distance to which the article is to be moved is equal to the distance between the two chains. The pointer then has to be re-adjusted so as to read correctly and its re-adjustment will depend upon the relative sizes of the pinion and the racks. This, however, is a matter of experiment and when the pointer is once set there is no need for any further adjustment, provided the weighings are made with the single chain.

In using my scale for purposes of determining specific gravity, it is only necessary to provide a disk calibrated with the proper numerals, and this may be done in precisely the same way as before by taking two or more substances of known specific gravity, balancing them in air and in water and in marking on the disk their appropriate numbers and subdividing the disk accordingly.

It will be seen that I have provided a device in which the fineness of the precious metals in common use can be quickly and accurately determined without the necessity of making a chemical analysis of the composition of the metal, or of resorting to expensive balances of delicate construction.

I am aware that various modifications of the device based upon the same general idea, might be made, but I regard as my own and wish to claim all such modifications as fairly fall within the spirit and the scope of the invention.

I claim:

1. In a balance, a casing, a beam, pivotally mounted within said casing, weights carried by said beam at one end, compensating means carried by said beam at the other end, said compensating means including a pair of rack bars, means arranged to project through said casing for moving one of said rack bars, a pinion for communicating the movement of one rack bar to the other rack bar, a pointer secured to the shaft of the pinion and a dial for indicating the movement of the pointer.

2. In a balance, a casing, a beam pivotally mounted within said casing, a series of adjustable weights carried by the beam on one end thereof, compensating means carried by the other end of the beam, said compensating means including a pair of rack bars, suspending means carried by one of said bars, a nut slidably supported by said casing and arranged to engage one of said bars, a threaded rod arranged to extend through said casing for moving said nut, a pinion for communicating the motion of one rack bar to the other, a pointer secured to the shaft and a dial for indicating the movement of the pointer.

3. In a balance, a casing, a beam pivotally suspended within said casing and provided with adjustable weights on one end, compensating means slidably secured to the opposite end of the beam, said compensating means including a pair of racks, a pinion for communicating the movement of one rack to the other, and a spring for holding said racks into engagement with said pinion, suspending means carried by one of said racks, a rod secured to said casing, a nut slidably mounted thereon and provided with arms, a pin carried by one of said racks and arranged to be engaged by the arms of said nut, and a rod rotatably mounted in the wall of said casing and having a threaded end arranged to engage the threads of said nut.

4. In a balance, a pivoted beam provided with slidable weights on one end and having compensating means slidably mounted on the opposite end, suspending means carried by said compensating means, a screw for moving said compensating means longitudinally of the beam, a dial fixed with respect to said beam, and a rotary pointer mounted at the center of the dial and actuated by said compensating means for indicating the amount of movement of the suspending means.

5. In a balance, a base, an adjustable standard carried by said base, a casing pivotally mounted on said adjustable standard and adapted to be adjusted with respect to said standard, means for retaining the casing in its adjusted position, a beam, a support therefor provided with upper and lower knife edges, and a pair of pivoted bearings arranged to receive the knife edges.

6. In a balance, a casing, a balance-beam, a support therefor having upper and lower knife-edges, pivoted bearings for said knife-edges, a supporting plate arranged to engage said beam to lift it from its bearings, and a threaded rod extending through the wall of the casing and arranged to engage said plate for bringing the latter into and out of engagement with said beam.

7. In a balance, a casing, a beam pivotally mounted on said casing, a pair of weights slidably mounted on said beam, one of said weights being provided with stop members, a third weight slidably supported upon said stop members, means for adjusting the position of one of said weights independently of the others, one of said slidable weights being moved through the contact of the third weight with the stop members and said third weight having a movement independent of the weight upon which it is mounted.

BENJAMIN RUSH JOLLY.

Witnesses:
J. C. MATTHUS,
THEO. M. WEBB.

Copies of this patent may be obtained for five cents each, by addressing the "Commissioner of Patents, Washington, D. C."